United States Patent [19]

Dotzauer et al.

[11] Patent Number: 5,047,295

[45] Date of Patent: Sep. 10, 1991

[54] CONCRETE ROOF TILE

[75] Inventors: Bernhard Dotzauer, Maxdorf; Rolf Dersch, Frankenthal; Johannes Vinke, Neustadt; Harutyun Hanciogullari, Birkenau; Manfred Schwartz, Ludwigshafen; Volkmar Berg, Graben, all of Fed. Rep. of Germany

[73] Assignee: BASF Aktiengesellschaft, Ludwigshafen, Fed. Rep. of Germany

[21] Appl. No.: 461,916

[22] Filed: Jan. 8, 1990

[30] Foreign Application Priority Data

Jan. 16, 1989 [DE] Fed. Rep. of Germany ....... 3901073

[51] Int. Cl.$^5$ .............................................. B32B 27/00
[52] U.S. Cl. ..................................... 428/500; 427/421; 525/328.5; 525/329.4; 525/329.7; 525/330.2; 525/376; 526/240
[58] Field of Search ....................... 428/500; 526/240; 525/328.5, 329.4, 329.7, 330.2

[56] References Cited

U.S. PATENT DOCUMENTS

| | | | |
|---|---|---|---|
| 3,979,354 | 9/1976 | Dyckman et al. | 526/240 |
| 4,064,338 | 12/1977 | Russell | 526/240 |
| 4,098,971 | 7/1978 | Phillip et al. | 526/240 |
| 4,121,034 | 10/1978 | Beduarski et al. | 526/240 |
| 4,157,999 | 6/1979 | Matsuda et al. | 428/541 |
| 4,191,838 | 3/1980 | Merger et al. | 526/315 |
| 4,250,070 | 2/1981 | Ley et al. | 525/376 |
| 4,267,091 | 5/1981 | Geelhaar et al. | 526/316 |
| 4,485,197 | 11/1984 | Yokoi et al. | 523/177 |
| 4,576,838 | 3/1986 | Rosen et al. | 428/907 |
| 4,596,724 | 6/1986 | Lane et al. | 428/907 |

Primary Examiner—Bernard Lipman
Attorney, Agent, or Firm—Oblon, Spivak, McClelland, Maier & Neustadt

[57] ABSTRACT

A concrete roof tile is coated with an unfilled or aggregate- and/or pigment-filled film of a copolymer containing (a) from 0.03 to 2% by weight of tin in the form of a polymerizable organotin compound (b) from 0.5 to 5% by weight of (meth)acrylic acid, (meth)acrylamide and/or vinylsulfonic acid and (c) from 0.1 to 5% by weight of carbonyl-containing monomers crosslinked with certain dicarboxodihydrazides, besides (d) at least two (meth)acrylic esters of $C_1$–$C_8$ alkanols and/or styrene as copolymerized units in such an amount and such mixing ratios that the copolymer has a glass transition temperature of $-15$ to $+10°$ C. prior to crosslinking.

2 Claims, No Drawings

CONCRETE ROOF TILE

The present invention relates to a coated concrete roof tile having improved properties and to a process for producing same.

Concrete roof tiles are produced from mortars whose consistency permits the final shaping The roof tile retains its shape even during the process of hardening, which usually takes place at from 40° to 100° C. Concrete roof tiles are prone to lime efflorescence; lime efflorescence is produced by the reaction of calcium hydroxide on the surface of the roof tile with the carbon dioxide in the air. Calcium hydroxide can get to the surface of the roof tile not only during the process of hardening but also under the conditions of weathering. The consequence is a stained, unsightly roof. Concrete roof tiles, which usually have a pigment content, are surface coated after shaping but prior to hardening, ie. when in the "green" state, with coating compositions which are intended to prevent lime efflorescence on the surface of roof covering materials, and then stored for from 6 to 12 hours in hardening chambers, which are usually at the abovementioned temperatures; in the course of this storage period they become hard and the coating composition dries at the same time. On occasion, after the tile has hardened, a further portion of coating composition is applied to it and dried.

Coating compositions very widely used in the production of concrete roof tiles are aqueous compositions formed from a binder dispersion, inorganic aggregates such as chalk, quartz powder and iron oxide pigments, additives for setting under the desired minimum film forming temperature (=MFFT), for example sparingly volatile esters or hydrocarbons or plasticizers, and also from pigment dispersers and antifoams. The pigment volume concentration (PVC) of these coating compositions is about 40%.

The binders used are for example emulsion polymers based on n-butyl acrylate or 2-ethylhexyl acrylate and styrene, the MFFT of the basic polymer dispersion always being about 20° C. and that of the coating system about 5°-8° C.

These coatings have over the years been found to have the following disadvantages:

The additives required for safe and complete film formation are only incompletely removed in the course of the forced drying step and do not guarantee an adequate calcium ion barrier from the start.

Nor does this phase always provide the similarly required barrier effect in relation to water, so that premature erosion may occur in winter due to the freeze-thaw cycle.

This represents a hazard for example for roofs made from concrete roof tiles produced in the fall/winter period. The same is true of concrete roof tiles which as usual were stored packed in the open, since it cannot be ruled out that moisture can get into the packages as water of condensation or as rain.

It is an object of the present invention to provide a coated concrete roof tile which under all practically experienced storage and use conditions is safe from lime efflorescence, has an improved barrier effect in relation to water and shows improved protection against premature destruction by temperature changes around freezing. A further object is to provide a concrete roof tile which has the benefit of algicidal protection without polluting the environment by the release of toxic substances. It is yet another object of the present invention to provide a process for producing such a concrete tile without the use of additives or auxiliaries which, in the course of the disposal of wastes, might contaminate the wastewater or groundwater.

We have found that these objects are achieved by a concrete roof tile coated in a conventional manner on at least one of its surfaces with an unfilled or aggregate- and/or pigment-filled film of a copolymer containing the following monomer units in copolymerized form:

(a) from 0.03 to 2% by weight of tin in the form of units of at least one organotin compound having one or more polymerizable C=C bonds, (b) from 0.5 to 5% by weight of units of acrylic acid, methacrylic acid, acrylamide, methacrylamide and/or vinylsulfonic acid, (c) from 0.1 to 5% by weight of units of carbonylcontaining monomers crosslinked with dihydrazides of aliphatic dicarboxylic acids of from 2 to 10 carbon atoms, and (d) the difference to 100% by weight of units of at least two monomers selected from the group consisting of the acrylic and methacrylic esters of $C_1$-$C_8$-alkanols and styrene in such an amount and in such mixing ratios that the copolymer has a glass transition temperature of from $-15°$ to $+10°$ C. prior to crosslinking.

A concrete roof tile of this type is produced according to the present invention by applying to at least one surface of the "green" roof tile an aqueous coating composition containing (A) a dispersed copolymer of ($A_1$) from 0.03 to 2% by weight (calculated as tin) of at least one organotin compound having one or more polymerizable C=C bonds, ($A_2$) from 0.5 to 5% by weight of acrylic acid, methacrylic acid, acrylamide, methacrylamide and/or vinylsulfonic acid, ($A_3$) from 0.1 to 5% by weight of at least one monomer having one or more carbonyl groups and ($A_4$) the difference to 100% by weight of at least two monomers selected from the group consisting of the acrylic and methacrylic esters of $C_1$-$C_8$-alkanols and styrene in such an amount and such mixing ratios that the copolymer has a glass transition temperature of from $-15°$ to $+10°$ C., (B) from 0.2 to 3% by weight (based on dry copolymer) of at least one water-soluble dihydrazide of an aliphatic dicarboxylic acid of from 2 to 10 carbon atoms, (C) from 1 to 5% by weight (based on dry copolymer) of at least one emulsifier selected from the group consisting of the fatty alcohol sulfates and fatty alcohol ethoxylates, and (D) up to 300% by weight (based on dry copolymer) of mineral aggregates and/or color pigments, then, in the course of the high-temperature hardening of the concrete roof tile, drying the composition to leave a film and, optionally, after the high-temperature hardening, applying a further layer of the composition and again drying it to leave a film.

The coating composition is advantageously prepared starting from an aqueous dispersion of copolymer A having a viscosity at 23° C. of from 0.5 to 2.5 Pa.s and preferably a pH of about 8.

The organotin compounds of the type mentioned under $A_1$ are known or obtainable by known methods Examples of such compounds are: tri-n-butyltin acrylate, tri-n-butyltin methacrylate, tricyclohexyltin methacrylate, tricyclohexyltin acrylate, triphenyltin acrylate, triphenyltin methacrylate, tri-n-propyltin acrylate, tri-n-propyltin methacrylate, triisopropyltin acrylate, triisopropyltin methacrylate, tri-sec-butyltin acrylate, tri-sec-butyltin methacrylate, triethyltin acrylate, triethyltin methacrylate, diethylbutyltin acrylate, diethylbutyltin methacrylate, diethylamyltin acrylate, diethylamyltin methacrylate, diamylmethyltin acrylate, diamylmethyltin methacrylate, propylbutylamyltin acrylate, propylbutylamyltin methacrylate, diethylphenyltin acrylate, diethylphenyltin methacrylate, ethyldiphenyltin acrylate, ethyldiphenyltin methacrylate, n-octyldiphenyltin acrylate, n-octyldiphenyltin methacrylate, diethylisooctyltin acrylate, diethylisooctyltin methacrylate, di-n-butyltin diacrylate, di-n-butyltin dimethacrylate, the tripropyltin monoester and diester of maleic acid, the tricyclohexyltin monoester and diester of maleic acid, the triphenyltin monoester and diester of maleic acid, the tri-n-butyltin monoester and diester of maleic acid and the corresponding monoesters and diesters of itaconic and citraconic acid, allyltri-n-butyltin, diallyldi-n-butyltin, allyltricyclohexyltin, diallyldicyclohexyltin, allyltriphenyltin and diallyldiphenyltin. Particularly effective organotin compounds are those which contain an acryloyl or methacryloyl group and three alkyl groups of from 3 to 6 carbon atoms bonded to the tin. Of these, tri-n-butyltin methacrylate is preferred because it is readily available.

The organotin compounds are copolymerized into polymer A via their C=C double bond(s) in such an amount that the tin content of the polymer is from 0.03 to 2% by weight, preferably from 0.3 to 1% by weight.

Those of the monomers mentioned under $A_2$ which carry carboxyl or sulfo groups may be present in copolymer A in the form of the free acids or in completely or partially neutralized form, in particular in alkali metal or ammonium salt form.

Carbonyl-containing monomers $A_3$ are monomers having at least one aldo or keto group and at least one polymerizable double bond. Of particular interest are acrolein, diacetone acrylamide, formylstyrene, vinyl alkyl ketone, preferably of 4 to 7 carbon atoms, such as in particular vinyl methyl ketone, vinyl ethyl ketone and vinyl isobutyl ketone, and/or (meth)acryloyloxyalkylpropanals of the general formula

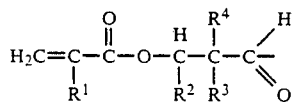

where $R^1$ is —H or $CH_3$, $R^2$ is —H or $C_1$-$C_3$-alkyl, $R^3$ is $C_1$-$C_3$alkyl, and $R^4$ is $C_1$-$C_4$-alkyl. Such (meth)acryloyloxyalkylalkylpropanols can be prepared by the process of German Patent Application P 27 22 097.9 by esterifying β-hydroxyalkylpropanals of the general formula

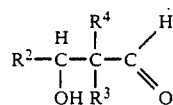

where $R^2$, $R^3$ and $R^4$ are each as defined above, in the presence of inert diluents and small amounts of sulfonic and mineral acids at from 40° to 120°, in particular at from 50° to 90°. Keto-containing monomers further include diacetone acrylate, acetonyl acrylate, diacetone methacrylate, 2-hydroxypropyl acrylate acetoacetate, 1,4-butanediol acrylate acetoacetate and 2-ketobutyl (meth)acrylate. The amount of carbonyl or keto-containing copolymerized comonomer is preferably from 1 to 4% by weight, based on copolymer A.

The monomers of the group mentioned under $A_4$ supply by weight by far the largest proportion of copolymer A. Their identity and mixing ratios therefore chiefly dictate the level of the glass transition temperature of copolymer A. The general principles which apply here are known to the person skilled in the art. They shall therefore only be sketched out here in condensed form: A distinction is made between hardening and softening monomers. The terms hardening and softening refer to monomers which in the literature are occasionally imprecisely chararacterized as hard and soft respectively, ie. monomers which, polymerized on their own, produce hard or soft homopolymers. A hardening monomer, then, is a monomer whose homopolymer has a glass transition temperature of from about 25° to 120° C., while a softening monomer is a monomer whose homopolymer has a glass transition temperature of from about −60° to +25° C. It is true that the boundary between these two groups of monomers is fluid, but typical representatives are known for both groups.

Typical hardening monomers are for example styrene, methyl methacrylate and tert-butyl acrylate. Of these, methyl methacrylate and styrene are preferred for the purposes of the present invention.

Typical softening monomers are for example acrylic and methacrylic esters of non-tertiary alkanols of from 2 to 8 carbon atoms. Of these, n-butyl acrylate, n-butyl methacrylate and ethylhexyl acrylate are preferred for the purposes of the present invention.

The person skilled in the art knows that copolymers which contain both softening and hardening monomers as copolymerized units have glass transition temperatures between those of the respective homopolymers. It is therefore a simple matter to set predetermined glass transition temperatures by selecting the monomers and their mixing ratios. Typical combinations of monomers of the type mentioned under $A_4$ whose glass transition temperatures are within the range to be obtained according to the invention are for example (in % by weight):

65% of 2-ethylhexyl acrylate, 35% of styrene,
55% of 2-ethylhexyl acrylate, 45% of styrene,
60% of 2-ethylhexyl acrylate, 20% of methyl methacrylate, 20% of styrene,
55% of 2-ethylhexyl acrylate, 35% of butyl methacrylate, 10% of styrene,
25% of butyl acrylate, 25% of 2-ethylhexyl acrylate, 50% of styrene,
60% of butyl acrylate, 40% of styrene,
30% of butyl acrylate, 30% of 2-ethylhexylacrylate, 20% of styrene, 20% of methyl methacrylate,
35% of butyl acrylate, 30% of methyl methacrylate, 35% of butyl methacrylate The additional incorporation of the monomers mentioned under $A_1$ to $A_3$ likewise affects the glass transition temperatures of copolymers A. For this reason it may be necessary to adapt the above-indicated mixing ratios of monomers $A_4$.

The glass transition temperature can be determined by conventional methods, for example from the measurement of the modulus of elasticity in a creep test as a function of the temperature or by using differential thermal analysis (DTA) (see on this matter A. Zosel, Farbe and Lack 82 (1976), 125-134).

The aqueous dispersons of copolymer A may be prepared in a conventional manner by copolymerizing monomers $A_1$ to $A_4$ in aqueous emulsion using customary emulsifiers and dispersants, and usually have a copolymer A concentration of from 40 to 60% by weight. The emulsifying and dispersing component usually comprises from 0.2 to 3% by weight, based on the amount of copolymer A, of anionic and/or nonionic emulsifiers, such as sodium dialkylsulfosuccinate, sodium salts of sulfated oils, sodium salts of alkanesulfonic acids, sodium alkylsulfate, potassium alkylsulfate, ammonium alkylsulfate, alkali metal salts of sulfonic acids, alkoxylated $C_{12}$-$C_{24}$-fatty alcohols and alkoxylated alkylphenols, and also ethoxylated fatty acids, fatty alcohols and/or fatty amides, ethoxylated alkylphenols, or sodium salts of fatty acids, such as sodium stearate and sodium oleate. The preferred emulsifiers are fatty alcohol sulfates and fatty alcohol ethoxylates, since they are particularly readily biodegradable. The resulting fine dispersions are particularly highly suitable for the present invention. The average particle size of the dispersions according to the present invention is usually clearly below 100 nm. A typical weight distribution, determined using an analytical ultracentrifuge (W. Maechtle, Makromolekulare Chemie

| 185 (1984), 1025), is | |
|---|---|
| $D_{10}$ | 60 nm, |
| $D_{50}$ | 65 nm, |
| $D_{90}$ | 70 nm. |

The dispersion of copolymer A has added to it component (B), viz. at least one water-soluble dihydrazide of an aliphatic dicarboxylic acid containing from 2 to 10, preferably from 4 to 6, carbon atoms, advantageously in an amount of from 0.05 to 1, preferably from 0.4 to 0.6, mole per mole of carbonyl groups present in copolymer A. Specific examples of components (B) are: oxalodihydrazide, malonodihydrazide, succinodihydrazide, glutarodihydrazide, adipodihydrazide, sebacodihydrazide, maleodihydrazide, fumarodihydrazide and itaconodihydrazide.

The dispersion of components (A) and (B) is capable of forming, at room temperature, a bright, clear and tough/flexible film of low water uptake; after storage in water for 24 hours, the water content is less than 10%, usually less than 5%. The film is free of plasticizers and film forming agents.

The dispersion tends to produce little foam, if any, but for use in coating compositions it can be advantageous to add antifoam. Highly suitable antifoams are for example silicone-based products.

The abovementioned organotin compounds are completely incorporated into the polymer chains and they are also very stable to hydrolysis. For instance, the serum of the copolymer A dispersions is found to have a tin concentration of about 1 ppm irrespective of whether 0.1 or 5% of organotin compound was used.

Having an $LC_{50}$ (96 h, *Salmo gairdneri* RICH.) of above 1,000 mg/l, these polymer dispersions have no acute toxicity for fish.

Dispersions of copolymers A must accordingly be considered more favorable than those which contain sparingly soluble zinc dithiocarbamate and/or benzimidazole derivatives as state of the art biocides. The latter have $LC_{50}$ values (golden orfe) of below 500 mg/l.

Surprisingly, the very low concentration of the highly hydrolysis-resistant copolymerized tin component is sufficient to prevent the growth of algae, such as *Chlorella vulgaris*.

For conversion into coating compositions, the dispersions of copolymers A containing components (B) are admixed in a conventional manner with inorganic fillers and color pigments and brought to the desired viscosity with water. Suitable inorganic fillers are for example: chalk, quartz powder and/or baryte. Examples of color pigments are iron oxide red and black pigments Such a coating composition has in principle the following makeup:
- 40% of polymer dispersion with or without additional emulsifier as per (C)
- 20% of chalk
- 15% of quartz powder
- 5% of iron oxide pigment
- about 20% of water.

The pigment volume concentration of this formulation is about 45%, and its viscosity at 150 mPa.s (82 $s^{-1}$), measured by German standard specification DIN 53 018.

The concrete roof tile is produced in a conventional manner from ready-mixed concrete by an extrusion process. In the course of this process, it already receives its final shape. The coating composition is applied in a conventional manner, preferably by spraying, to the "green roof tile", ie. to the still wet concrete The total addon is about 300 g/m$^2$ (dry). The coated roof tile is introduced into a chamber. There, the concrete sets at from 40° to 65° C. in the course of from 6 to 12 hours, and the copolymer of the coating composition forms a film.

Thereafter the roof tile is preferably sprayed a second time with the coating composition. Drying takes place in a tunnel furnace at around 100° C. ambient air temperature. The tunnel furnace and the subsequent cooling line are designed in such a way that complete film formation takes place.

The very uniform coatings have an outstanding barrier effect against calcium ions. They do not show any lime efflorescence following a waterbath treatment A particularly surprising feature is the long lifetime of the coatings as determined in a freeze-thaw cycle test, an accelerated weathering test in line with German standard specification DIN 52 104 customary in the concrete roof tile industry. The roof tiles according to the present invention survive at least twice as many, namely at least 1,200, freeze-thaw cycles without damage as those of the prior art, where damage is likely after from 300 to 600 freeze-thaw cycles.

We claim:

1. A concrete roof tile coated on at least one of its surfaces with an unfilled- or aggregate- or pigment-filled film of a crosslinked copolymer containing the following monomer units in copolymerized form:
   (a) from 0.03 to 2% by weight of tin in the form of units of at least one organotin compound having one or more polymerizable C=C bonds,
   (b) from 0.5 to 5% by weight of units of at least one compound from the group consisting of acrylic acid, methacrylic acid, acrylamide, methacrylamide and/or vinylsulfonic acid, (c) from 0.1 to 5% by weight of units of carbonyl-containing monomers crosslinked with dihydrazides of aliphatic dicarboxylic acids of from 2 to 10 carbon atoms, and (d) the difference to 100% by weight of units of at least two monomers selected from the group consisting of the acrylic and methacrylic esters of $C_1$–$C_8$-alkanols and styrene in such an amount and in such mixing ratios that the copolymer has a glass transition temperature of from $-15°$ to $+10°$ C. prior to crosslinking.

2. A concrete roof tile as claimed in claim 1, coated with a copolymer in which the units of an organotin compound are those of tri-n-butyltin methacrylate.

* * * * *